United States Patent

Smith

(10) Patent No.: US 8,827,281 B2
(45) Date of Patent: Sep. 9, 2014

(54) TIGHT NEST SHOPPING CART

(71) Applicant: Unarco Industries LLC, Wagoner, OK (US)

(72) Inventor: Woody Smith, Stillwater, OK (US)

(73) Assignee: Unarco Industries LLC, Wagoner, OK (US)

( * ) Notice: Subject to any disclaimer, the term of this patent is extended or adjusted under 35 U.S.C. 154(b) by 0 days.

(21) Appl. No.: 13/757,208

(22) Filed: Feb. 1, 2013

(65) Prior Publication Data

US 2013/0207362 A1 Aug. 15, 2013

Related U.S. Application Data

(60) Provisional application No. 61/594,131, filed on Feb. 2, 2012.

(51) Int. Cl.
  *B62D 39/00* (2006.01)
  *B62B 3/14* (2006.01)

(52) U.S. Cl.
  CPC ........................................ *B62B 3/14* (2013.01)
  USPC .................................. 280/33.991; 280/47.34

(58) Field of Classification Search
  USPC ......................................... 280/33.991, 47.34
  See application file for complete search history.

(56) References Cited

U.S. PATENT DOCUMENTS

| | | |
|---|---|---|
| 2,590,047 A | 3/1952 | Sides |
| 2,596,775 A | 5/1952 | Kasper |
| 2,689,132 A | 9/1954 | Forest |
| 2,911,227 A | 9/1956 | Davis |
| 2,766,049 A | 10/1956 | Just et al. |
| 3,112,934 A | 12/1963 | Buczak |
| 3,190,673 A | 6/1965 | Olander et al. |
| 3,751,059 A | 8/1973 | Dunder et al. |
| 3,829,114 A * | 8/1974 | Cohen et al. ............. 280/33.991 |
| 4,046,394 A | 9/1977 | Thompson, Jr. |
| 5,473,991 A * | 12/1995 | Crum ......................... 104/172.3 |
| 5,613,696 A | 3/1997 | de Luna |
| 7,673,886 B2 | 3/2010 | Ondrasik |
| 7,766,347 B2 | 8/2010 | Ryan et al. |
| 7,887,068 B2 | 2/2011 | Ferguson |
| 8,056,909 B2 | 11/2011 | Burdwood et al. |
| 2004/0201187 A1 * | 10/2004 | Ondrasik ................. 280/33.991 |

FOREIGN PATENT DOCUMENTS

GB 2024116 1/1980

OTHER PUBLICATIONS

Polycart; http://www.flickr.com/photos/polycart/5786356232; Publication Date: May 24, 2011; 1 pg.

* cited by examiner

*Primary Examiner* — John Walters
*Assistant Examiner* — James Triggs
(74) *Attorney, Agent, or Firm* — DLA Piper LLP (US); R. Blake Johnston

(57) ABSTRACT

A shopping cart features a main tube member including a pair of frame side rail portions, a pair of handle riser portions attached to trailing sections of the pair of frame side rail portions and a handle cross portion connected between the pair of handle riser portions. A basket is attached to the pair of handle riser portions. A rear caster support includes a pair of rear caster legs joined by a crossbar. The pair of rear caster legs are connected one each to the pair of handle riser portions. A pair of rear casters are attached one each to the pair of rear caster legs. A pair of front casters are joined to the pair of frame side rail portions.

19 Claims, 3 Drawing Sheets

TIGHT NEST SHOPPING CART

CLAIM OF PRIORITY

This application claims priority to U.S. Provisional Patent Application No. 61/594,131, filed Feb. 2, 2012, the contents of which are hereby incorporated by reference.

FIELD OF THE INVENTION

The present invention relates generally to shopping carts and, in particular, to a shopping cart that provides a tight nesting distance.

BACKGROUND

Shopping carts are typically shipped and stored in a retail store in a nesting fashion where the basket and frame of a cart are inserted into, and trapped within, the basket and frame of a cart in front of it. As a result, the carts fit together so that their nested length is much less than if the carts were merely placed nose to tail. With regard to the basket, this typically accomplished by providing a basket rear wall or gate that is attached to the handle or remaining portion of the basket by a hinge at the top so that the gate swings upward and rests upon the top edge of at least one of the rear cart's basket side walls as it is pushed into the basket of the forward cart.

The "nesting distance" of the carts is defined as the horizontal distance between the axes of rotation (i.e. axles) of the rear wheels/casters of the nested carts. The nesting distance of prior art shopping carts is typically in the range of ten to eleven inches.

A shopping cart having a reduced nesting distance would reduce the amount of retail floor space required for shopping cart storage. This would be particularly advantageous in smaller retail establishments such as pharmacies and dollar stores. In addition, a shopping cart having a reduced nesting distance would provide improved logistics with regard to packing, loading and shipping.

A need therefore exists for a shopping cart that provides a reduced nesting distance.

DETAILED DESCRIPTION OF EMBODIMENTS

Figure 1:
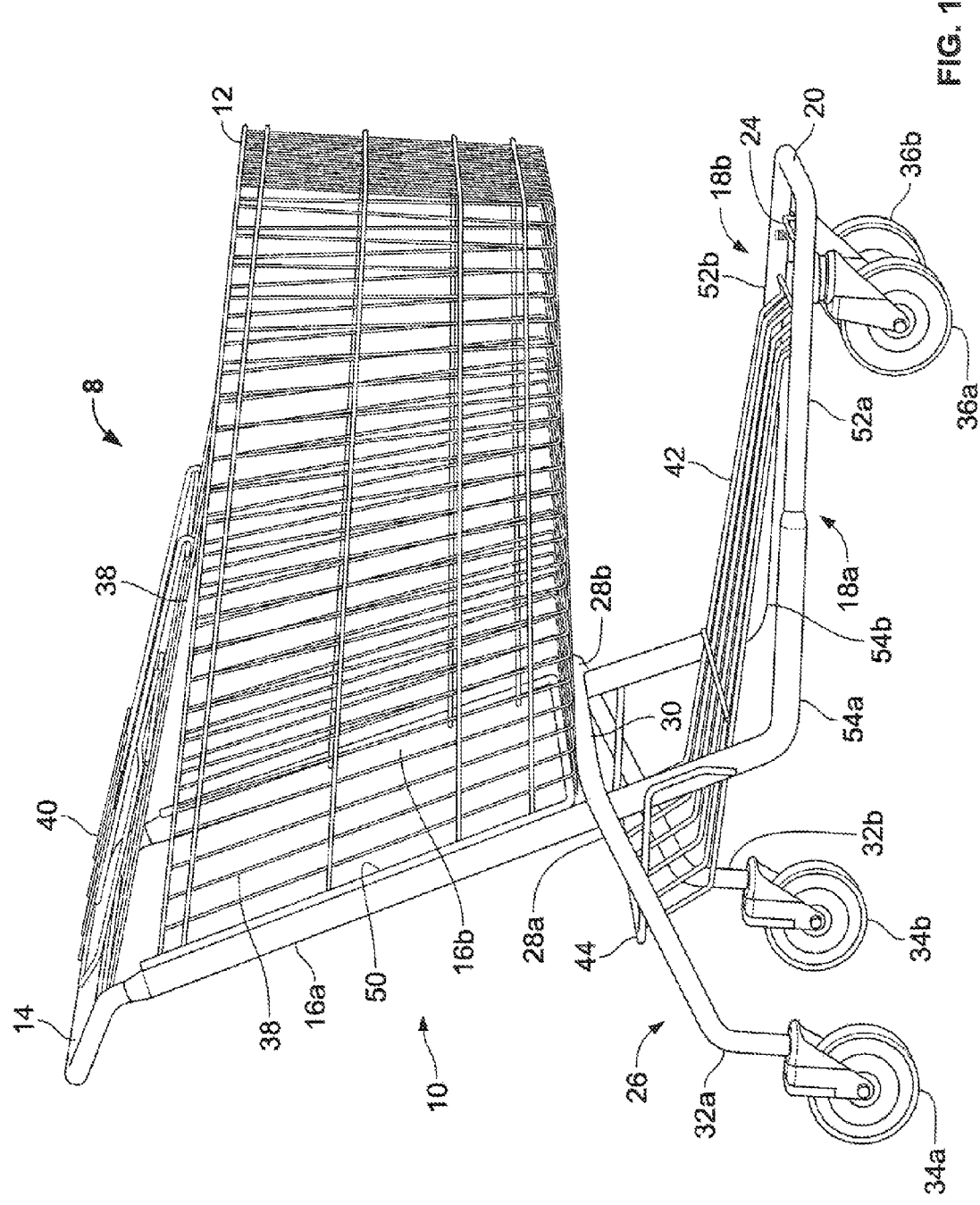
FIG. 1 is a side front perspective view of an embodiment of the shopping cart of the invention.
Figure 2:
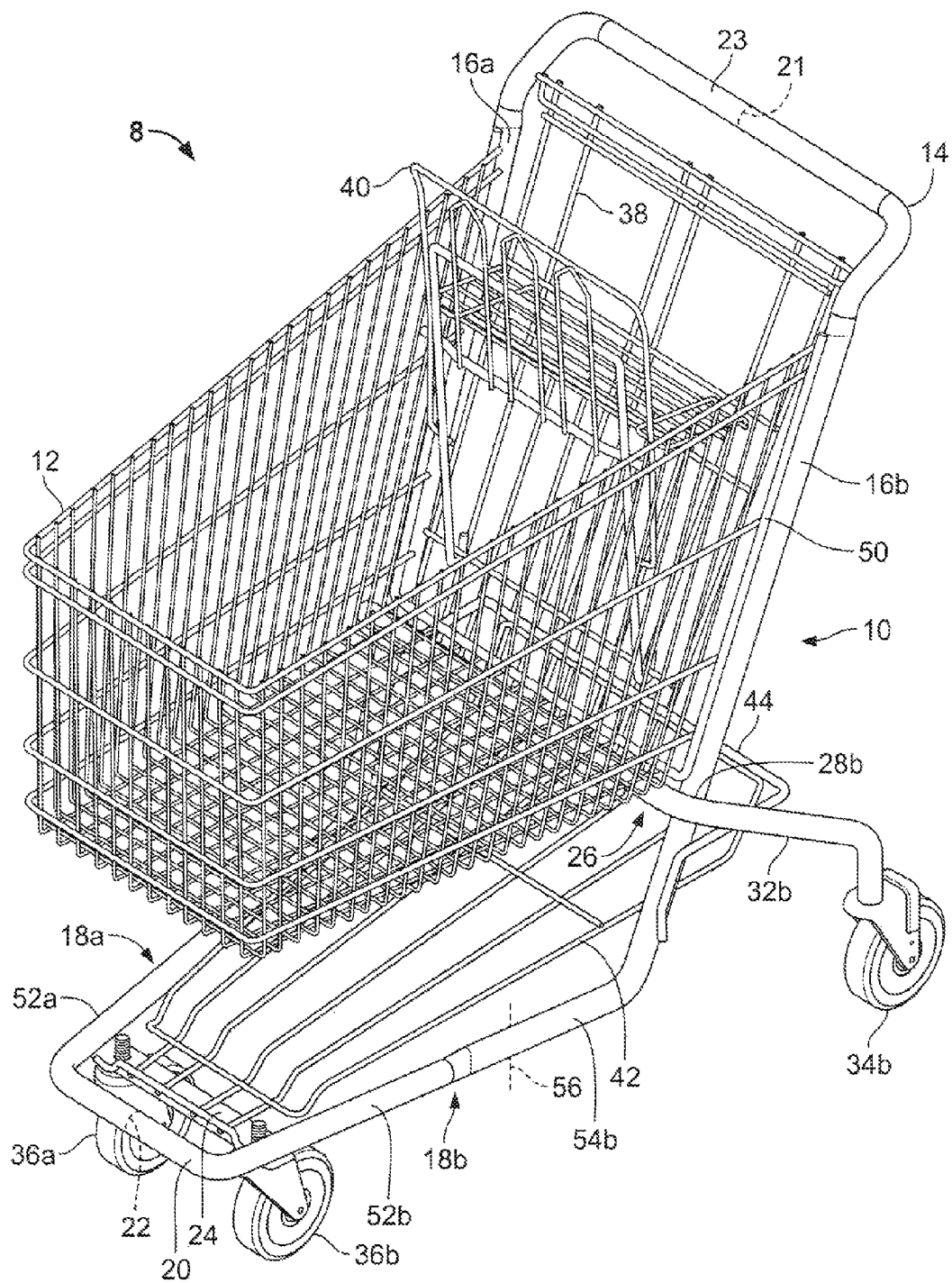
FIG. 2 is a top front perspective view of the shopping cart of FIG. 1.

An embodiment of the tight nest shopping cart of the present invention is indicated in general at 8 in FIGS. 1 and 2. As will be described in greater detail below, the shopping cart features a main tube member indicated in general at 10 that supports the cart basket 12. The main tube member features handle cross portion 14, a pair of handle riser portions 16*a* and 16*b*, a pair of frame side rail portions, indicated in general at 18*a* and 18*b*, and a nose portion 20. As is clear from FIGS. 1 and 2, the frame side rail portions 18*a* and 18*b* taper inward towards the nose portion 20 for nesting, as will be explained in greater detail below.

The main tube member 10, and thus the handle, handle riser, frame side rail and nose portions, of the shopping cart is preferably constructed from a single piece of tubing with a butt weld securing the two ends of the single piece of tubing together. Preferred locations for the butt weld include the handle cross portion 14, as indicated in phantom at 21 in FIG. 2, or at the nose portion 20 of the cart, as indicated in phantom at 22 in FIG. 2. If the weld is on the handle cross portion 14, it may be covered with handle cover 23 (FIG. 2), which may be made out of plastic, rubber or other materials known in the art, and attached by adhesive, fasteners, a snap fit or other fastening arrangement known in the art. Another option is to leave the main tube member 10 open, instead of having a nose portion, and weld, or otherwise attach, the resulting two leading ends of the frame side rail portions to a front caster plate, such as the one indicated at 24 of FIG. 2. The main tube member 10 is preferably steel tubing, but other materials including, but not limited to, aluminum may be used.

Main tube 10 may alternatively be constructed of individual tubing sections that are joined together to form the handle, handle riser, frame side rail and nose portions, of the shopping cart A rear caster support, indicated in general at 26 in FIGS. 1 and 2, features a generally inverted U-shape so as to form crossbar 30 and rear caster legs 32*a* and 32*b*. Inward-facing surfaces of rear caster legs 32*a* and 32*b* are welded to outward-facing surfaces of the handle riser portions 16*a* and 16*b* to form joints 28*a* and 28*b*. Rear caster support 26 is preferably also constructed from a single piece of steel tubing, but other materials including, but not limited to, aluminum may be used. Rear caster support 26 may alternatively be constructed of individual tubing sections that are joined together to for the crossbar 30 and rear caster legs 32*a* and 32*b*. Furthermore, other means known in the art for fastening may be used in place of the welds at joints 28*a* and 28*b*.

A pair of rear casters 34*a* and 34*b* are mounted to the bottom ends of the rear caster legs 32*a* and 32*b*. The rear casters stabilize the cart basket, as well as the rest of the cart, and provide the full function of a shopping cart. In addition, the crossbar 30 serves as a cross brace for the main tube member 10.

In an alternative embodiment, the rear caster legs 32*a* and 32*b* and the crossbar 30 of the rear caster support may be positioned between the handle riser portions 16*a* and 16*b* so that the joints 28*a* and 28*b* be are formed between outward-facing surfaces of the rear caster legs 32*a* and 32*b* and inward-facing surfaces of the handle riser portions 16*a* and 16*b*.

A pair of front casters 36*a* and 36*b* are secured to the front caster plate 24. The front caster plate 24 is preferably welded between the frame side rail portions 18*a* and 18*b* of the main tube member 10.

Figure 3:
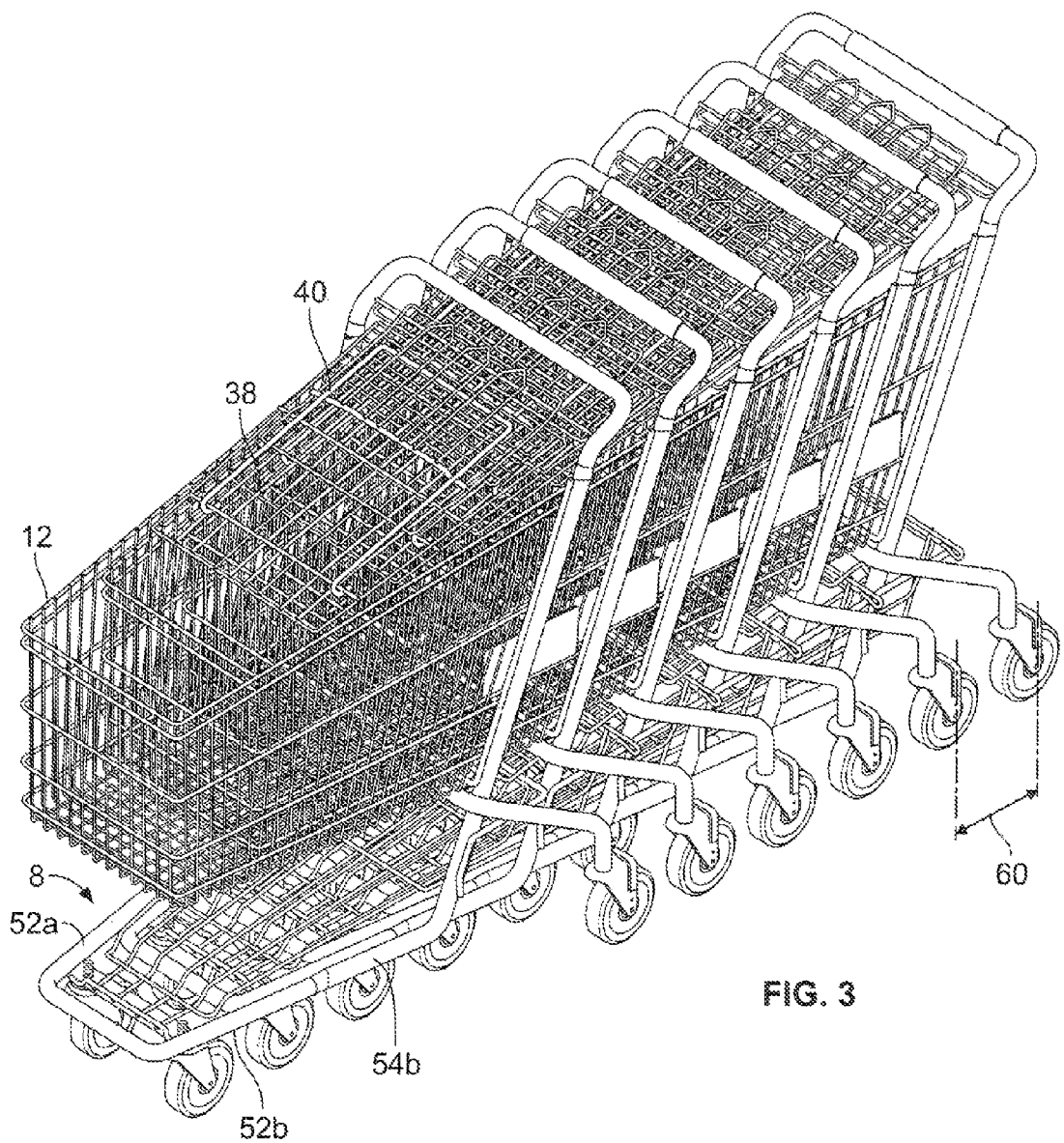
FIG. 3 is a perspective view showing a number of shopping carts of the type illustrated in FIGS. 1 and 2 in a nested configuration.

The cart basket 12 preferably features a conventional wire grid construction with rim wires and a pivoting gate rear wall of conventional design. With regard to the latter, rear wall or gate 38 of the basket is pivotally supported at the top so as to swing forward and up during nesting, as illustrated in FIGS. 1 and 3. The gate 38 may optionally be provided with a conventional folding child carrier 40, as illustrated in FIG. 2 (in the open configuration) and FIGS. 1 and 3 (in the closed configuration).

In addition, the shopping cart preferably features a bottom tray 42 that features a leading end portion connected to front caster plate 24. The bottom tray also features a trailing end portion that is secured to tray rim wire 44. Tray rim wire 44 is connected to outward-facing surfaces of the handle riser portions 16a and 16b and inward-facing surfaces of the rear caster legs 32a and 32b via welding. Alternative fastening arrangements known in the art may optionally be used instead. The bottom tray provides additional storage capacity to the cart and preferably features a conventional wire construction. As is illustrated in FIGS. 1 and 2, the bottom tray is inclined upwards, when moving from the leading end portion to the trailing end portion, to permit nesting, as illustrated in FIG. 3.

As is clear from FIGS. 1 and 2, there is no basket nest wire support to block the nesting of the shopping cart. The basket support is eliminated by welding the end rim 50 of the basket 12 to the handle riser portions 16a and 16b of the main tube member 10. Other fastening arrangements known in the art may be used to attached the end rim 50 of the basket to the handle riser portions 16a and 16b.

The shopping cart 8 may be stiffened with a "tube smash" at the radius between the handle riser portions 16a and 16b and the frame side rail portions 18a and 18b, and extending a few inches vertically and horizontally. This is a proven method to increase stiffness without the additional material cost of thicker gauge tubing or added gussets and may be accomplished as shown in commonly owned U.S. Pat. No. 7,090,230 to O'Quin, the contents of which are hereby incorporated by reference.

Figure 4:
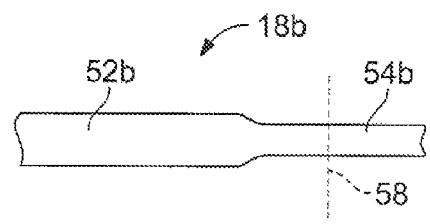
FIG. 4 is a partial enlarged top plan view of a portion of one of the frame side rail portions of the shopping cart of FIGS. 1 and 2.

As illustrated in FIGS. 2 and 4, frame side rail portion 18b features a leading section and a trailing section, illustrated at 52b and 54b, respectively. Trailing section 54b has been subjected to a tube smash so that it is thicker than leading section 52b in a vertical direction, indicated in phantom by axis 56 of FIG. 2, and thinner in a horizontal direction, indicated in phantom by axis 58, in FIG. 4. Leading section 52a and trailing section 54a of frame side rail portion 18a features a similar construction and relationship.

In addition to providing additional stiffness, as described above, the tube-smashed trailing sections 54a and 54b of the frame side rail portions reduce nesting distance. More specifically, as illustrated in FIG. 3, when two or more carts of the type illustrated in FIGS. 1 and 2 are nested, the frame side rail portions (18a and 18b in FIGS. 1 and 2) of the rear cart are inserted between the frame side rail portions of the front cart. Due to the reduced horizontal thickness of the tube-smashed trailing sections 54a and 54b of the front cart (as illustrated in FIG. 4), the frame side rail portions of the rear cart may be inserted further forward or inward with respect to the frame side rail portions of the front cart.

The shopping cart of FIGS. 1 and 2 thus provides tight nesting capability as illustrated in FIG. 3, where the shopping cart of FIGS. 1 and 2 is indicated at 8, is nested with a number of shopping carts of the same construction. More specifically, the nesting distance for the carts, indicated at 60 in FIG. 3, is less than approximately 6.5 inches—a significant reduction as compared to the typical 10.5 inches of prior art carts. These measurements are provided as an example only, and the nesting distance of the shopping cart of the invention may be greater or less than 6.5 inches.

While the preferred embodiments of the invention have been shown and described, it will be apparent to those skilled in the art that changes and modifications may be made therein without departing from the spirit of the invention, the scope of which is defined by the appended claims.

What is claimed is:

1. A shopping cart comprising:
   a. a main tube member including a pair of frame side rail portions, a pair of handle riser portions attached to trailing sections of the pair of frame side rail portions and a handle cross portion connected between the pair of handle riser portions;
   b. a basket attached to the pair of handle riser portions, said basket having a bottom and a trailing end portion;
   c. an inverted generally U-shaped rear caster support including a pair of rear caster legs joined by a crossbar, said pair of rear caster legs connected one each to the pair of handle riser portions and said crossbar positioned adjacent to the bottom and trailing end portion of the basket and to the pair of rear caster legs;
   d. a pair of rear casters attached one each to said pair of rear caster legs; and
   e. a pair of front casters joined to the pair of frame side rail portions.

2. The shopping cart of claim 1 wherein the pair of frame side rails portions each includes a leading section and the main tube member also includes a nose portion extending between leading sections of the pair of frame side rail portions.

3. The shopping cart of claim 2 wherein the main tube member is a single piece of tubing having ends that are butt welded together to form a butt weld.

4. The shopping cart of claim 3 wherein the butt weld is positioned in the nose portion.

5. The shopping cart of claim 3 wherein the butt weld is positioned in the handle cross portion.

6. The shopping cart of claim 5 further comprising a handle cover positioned over the handle cross portion and the butt weld.

7. The shopping cart of claim 2 wherein the frame side rail portions taper towards one another in direction moving towards the nose portion of the shopping cart.

8. The shopping cart of claim 1 wherein the pair of frame side rails portions each includes a leading section and further comprising a front caster plate extending between leading sections of the frame side rail portions and where the front casters are mounted to the front caster plate.

9. A shopping cart comprising:
   a. a main tube member including a pair of frame side rail portions, a pair of handle riser portions attached to trailing sections of the pair of frame side rail portions and a handle cross portion connected between the pair of handle riser portions;
   b. a basket attached to the pair of handle riser portions;
   c. a rear caster support including a pair of rear caster legs joined by a crossbar, said pair of rear caster legs connected one each to the pair of handle riser portions;
   d. a pair of rear casters attached one each to said pair of rear caster legs;
   e. a pair of front casters joined to the pair of frame side rail portions;
   f. each of the pair of handle riser portions are attached to one of the trailing sections of the pair of frame side rail portions by a radius and wherein each trailing section of the pair of frame side rail portions, each radius and a lower portion of each handle riser portion features a tube smash.

10. The shopping cart of claim 1 further comprising a bottom tray with a leading end portion attached to the pair of frame side rail portions and a trailing end attached to the pair of handle riser portions.

11. The shopping cart of claim 10 wherein the pair of frame side rails portions each includes a leading section and further comprising a front caster plate extending between leading sections of the frame side rail portions and where the front casters and the leading end portion of the bottom tray are mounted to the front caster plate.

12. A shopping cart comprising:
   a. a main tube member including a pair of frame side rail portions, a pair of handle riser portions attached to trailing sections of the pair of frame side rail portions and a handle cross portion connected between the pair of handle riser portions;
   b. a basket attached to the pair of handle riser portions;
   c. a rear caster support including a pair of rear caster legs joined by a crossbar, said pair of rear caster legs connected one each to the pair of handle riser portions;
   d. a pair of rear casters attached one each to said pair of rear caster legs;
   e. a pair of front casters joined to the pair of frame side rail portions;
   f. a bottom tray with a leading end portion attached to the pair of frame side rail portions and a trailing end attached to the pair of handle riser portions; and
   g. a tray rim wire attached to a trailing end portion of the bottom tray and wherein the tray rim wire is attached between the pair of handle riser portions and the pair of rear caster legs and positioned so that the bottom tray is inclined upwards in a direction moving towards the tray rim wire.

13. The shopping cart of claim 1 wherein the rear caster support is constructed from a single piece of tubing.

14. The shopping cart of claim 1 wherein the pair of rear caster legs are connected one each to the pair of handle riser portions by welding.

15. The shopping cart of claim 1 wherein said pair of rear caster legs each include inward-facing surfaces and the pair of handlebar riser portions each include outward-facing surfaces and wherein the inward-facing surfaces of said pair of rear caster legs are connected one each to the outward-facing surfaces of the pair of handle riser portions.

16. A shopping cart comprising:
   a. a main tube member including a pair of frame side rail portions, a pair of handle riser portions attached to trailing sections of the pair of frame side rail portions and a handle cross portion connected between the pair of handle riser portions;
   b. a basket attached to the pair of handle riser portions;
   c. a rear caster support including a pair of rear caster legs joined by a crossbar, said pair of rear caster legs connected one each to the pair of handle riser portions;
   d. a pair of rear casters attached one each to said pair of rear caster legs;
   e. a pair of front casters joined to the pair of frame side rail portions;
   f. said pair of rear caster legs each including inward-facing surfaces and the pair of handlebar riser portions each including outward-facing surfaces and wherein the inward-facing surfaces of said pair of rear caster legs are connected one each to the outward-facing surfaces of the pair of handle riser portions; and
   g. the pair of frame side rails portions each including a leading section and further comprising a bottom tray with a leading end portion attached to the leading sections of the pair of frame side rail portions, said bottom tray including a tray rim wire at a trailing end portion of the bottom tray where the tray rim wire is attached between the inward-facing surfaces of said pair of rear caster legs and the outward-facing surfaces of the pair of handle riser portions.

17. The shopping cart of claim 16 wherein the tray rim wire is positioned so that the bottom tray is inclined upwards in a direction moving towards the tray rim wire.

18. The shopping cart of claim 12 wherein the pair of frame side rail portions each includes a leading section and the main tube member also includes a nose portion extending between leading sections of the pair of frame side rail portions.

19. The shopping cart of claim 12 wherein the main tube member is a single piece of tubing having ends that are butt welded together to form a butt weld.

\* \* \* \* \*